United States Patent
Tsujimoto (10) Patent No.: US 7,036,415 B2
(45) Date of Patent: May 2, 2006

(54) BAND SAW BLADE

(75) Inventor: Susumu Tsujimoto, Hyogo (JP)

(73) Assignee: Amada Company, Limited, (JP)

( * ) Notice: Subject to any disclaimer, the term of this patent is extended or adjusted under 35 U.S.C. 154(b) by 0 days.

(21) Appl. No.: 09/073,825

(22) Filed: May 7, 1998

(65) Prior Publication Data

US 2002/0148340 A1    Oct. 17, 2002

(30) Foreign Application Priority Data

May 8, 1997    (JP) .................................. 9-118311

(51) Int. Cl.
    *B23D 61/12*    (2006.01)
(52) U.S. Cl. ............................. 83/661; 83/846; 83/855
(58) Field of Classification Search .................. 83/661, 83/835–855
    See application file for complete search history.

(56) References Cited

U.S. PATENT DOCUMENTS

| | | | | |
|---|---|---|---|---|
| 29,688 A | * | 8/1860 | German | |
| 154,104 A | * | 8/1874 | Vosburgh | |
| 566,865 A | * | 9/1896 | Morrish | |
| 2,227,864 A | * | 1/1941 | Ronan | 83/845 |
| 2,534,424 A | * | 12/1950 | Dryden | 83/846 |
| 2,826,941 A | * | 3/1958 | Kolesh | 76/112 |
| 3,287,793 A | * | 11/1966 | Battersby | 407/61 |
| 4,179,967 A | * | 12/1979 | Clark | 83/852 X |
| 4,557,172 A | * | 12/1985 | Yoneda | 83/850 X |
| 4,640,172 A | * | 2/1987 | Kullmann et al. | 83/835 |
| 4,813,324 A | * | 3/1989 | Yoshida et al. | 83/851 |
| 5,018,421 A | * | 5/1991 | Lucki et al. | |
| 5,094,135 A | * | 3/1992 | Nakahara et al. | 83/851 |
| 5,410,935 A | * | 5/1995 | Holston et al. | 83/851 |
| 5,603,252 A | * | 2/1997 | Hayden, Sr. | 83/851 |
| 5,606,900 A | * | 3/1997 | Staddard | 83/851 |
| 5,697,280 A | * | 12/1997 | Armstrong et al. | 83/852 X |
| 5,868,058 A | * | 2/1999 | Senegas | 83/846 |
| 6,003,422 A | * | 12/1999 | Holston | |
| 6,119,571 A | * | 9/2000 | Hayden, Sr. | 83/661 |

* cited by examiner

*Primary Examiner*—Kenneth E. Peterson
(74) *Attorney, Agent, or Firm*—Blank Rome LLP (57)    ABSTRACT

A band saw blade includes a plurality of set teeth which are formed in a variable pitch. In that construction, a bending lengths of each of the set teeth at a setting and bending position or at a bendingly setting position are substantially equal to each other.

3 Claims, 8 Drawing Sheets

BAND SAW BLADE

BACKGROUND OF THE INVENTION

1. Field of the Invention

The present invention relates to a band saw blade used for a band sawing machine such as a horizontal band sawing machine and a vertical band sawing machine.

2. Description of the Related Arts

Conventionally, there is a band saw blade with a variable pitch in which a pitch of a saw tooth is different. The saw tooth of the band saw blade is constituted by a left-set tooth and a right-set tooth.

However, since the pitch of the saw tooth is different, it is complex to adjust a setting amount in each of the set teeth, and it is hard to accurately form the setting amount.

SUMMARY OF THE INVENTION

The present invention has been achieved with such points in mind.

It therefore is an object of the present invention to provide a band saw blade which can make it simple to adjust a setting amount in each of set teeth and can adjust a plurality of set teeth at the same time.

Another object of the present invention is to provide a band saw blade which can accurately form the setting amount of the set tooth as substantially same amount as previously desired, and can intend to increase a life of the band saw blade and to improve a roughness of a cutting surface.

To achieve the object, according to a first aspect of the present invention, there is provided a band saw blade comprising: a plurality of set teeth, the plurality of set teeth being formed in a variable pitch, wherein a bending lengths of each of the set teeth at a setting and bending position or at a bendingly setting position are substantially equal to each other.

By making the bending length of each of the set teeth at the bending position substantially the same length, it is possible to make a bending resistance at a time of form a setting substantially constant, and a spring back amount of each of the set teeth after the set tooth is bent can be substantially constant. Further, a plurality of set teeth can be adjusted and pressed along the setting and bending position at the same time and the setting amount can be simply adjusted.

According to a second aspect of the present invention, there is provided a band saw blade comprising: a plurality of set teeth, the plurality of set teeth being formed in a variable pitch, wherein a bending length of each of the set teeth at a setting and bending position is substantially the same length; and setting amounts in right and left directions of each of the set teeth are substantially equal to each other.

In accordance with the structure mentioned above, even in the structure comprising a plurality of setting teeth having a different setting amount in the right and left directions, the setting teeth having the setting amounts in the right and left directions equal to each other are accurately set to the right and left directions with respect to each other, as substantially same amount as previously desired.

According to a third aspect of the present invention, as it depends from the first or the second aspect, each of the set teeth has substantially the same shape in a portion from a setting and bending position line or from a bendingly setting position line to a tip.

By making the shape of each of the set teeth in the portion from the setting and bending position line or from the bendingly setting position line to the tip substantially the same shape, a deforming amount of the tip becomes substantially the same as that of each of the set teeth, so that the setting amount of each of the set teeth is made uniform.

Accordingly, as well as the spring back amount of each of the set teeth is substantially equal to each other, the set tooth can be set and formed in a more even and accurate manner. Further, abrasions of each of the set teeth in the band saw blade can be made even, the life of the band saw blade can be increased and the roughness of the cutting surface on a work to be cut can be improved.

According to a fourth aspect of the present invention, as it depends from the first, the second or the third aspect, the setting and bending position or the bendingly setting position in each of the set teeth is positioned on a same straight line.

Accordingly, at a time of setting and bending each of the set teeth, the setting and bending can be easily performed by making a clamp position by a clamp vice for clamping the band saw blade as a reference position or a standard position.

As mentioned above, in any of the aspects, the setting and forming can be easily and accurately performed, so that an improvement in the roughness of the cutting surface on the work to be cut and an increase of the life of the band saw blade or band sawing machine which are responsible to the actual need by users in the market can be realized.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters.

Figure 7A:
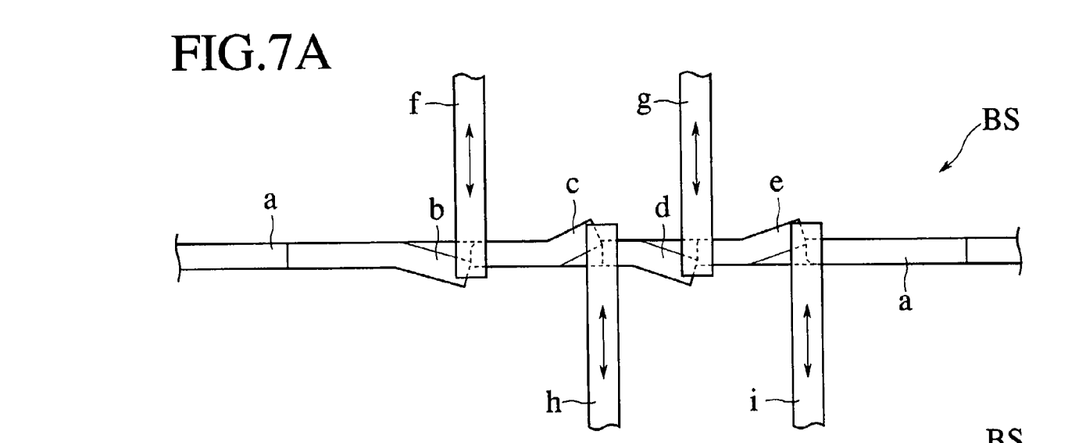
FIGS. 7A and 7B are schematic views which show a structure of the band saw blade and a set pressing element.
Figure 7B:
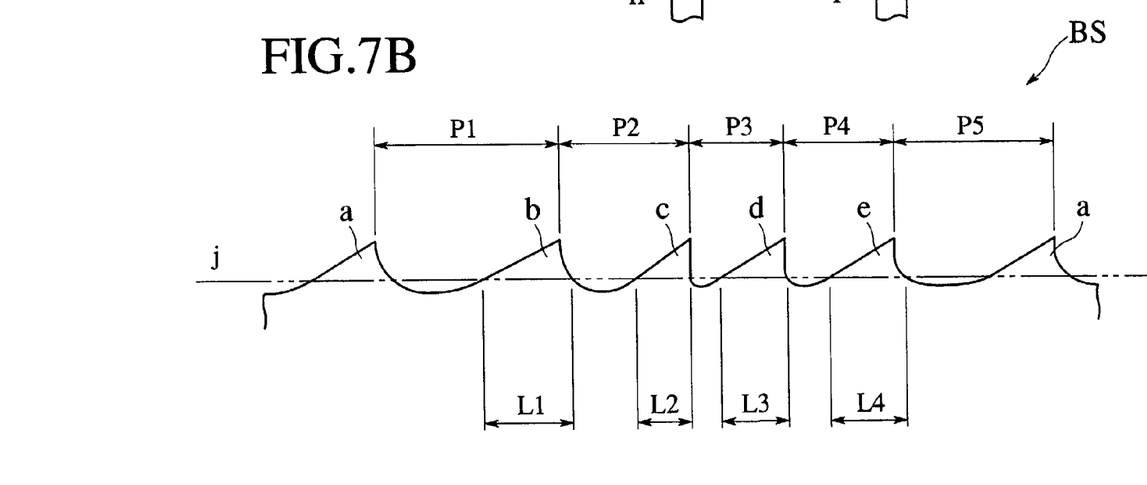

In accordance with the present invention, a band saw blade BS used for a band sawing machine is structured in a variable pitch, for example, having five teeth a to e disposed in such a manner as to have five kinds of different pitches P1 to P5 as one group, as shown in FIGS. 7A and 7B. Further, the a tooth is constituted by an unset tooth having no set, the b and d teeth are constituted by right-set teeth and the c and e teeth are constituted by left-set teeth.

Each of the set teeth b to e shown in FIG. 7A is pressed by pressing elements f to i so as to be performed a setting process. Further, as shown in FIG. 7B, an j—j line indicates a setting and bending position (a position of a clamp vice for clamping the band saw blade BS at a time of performing a setting), however, the respective bending lengths of the set teeth b to e are set to be L1 to L4 and they are all different in length ($L1 \neq L2 \neq L3 \neq L4$).

Figure 8A:
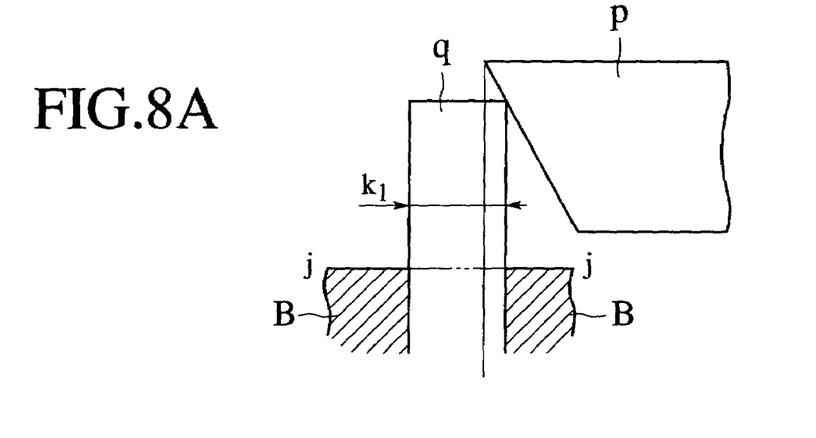
FIGS. 8A, 8B and 8C are schematic views which show a setting process in the band saw blade.
Figure 8B:
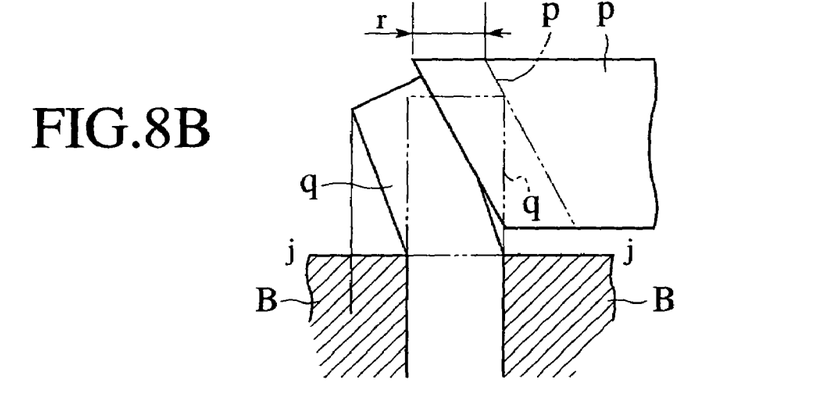
Figure 8C:
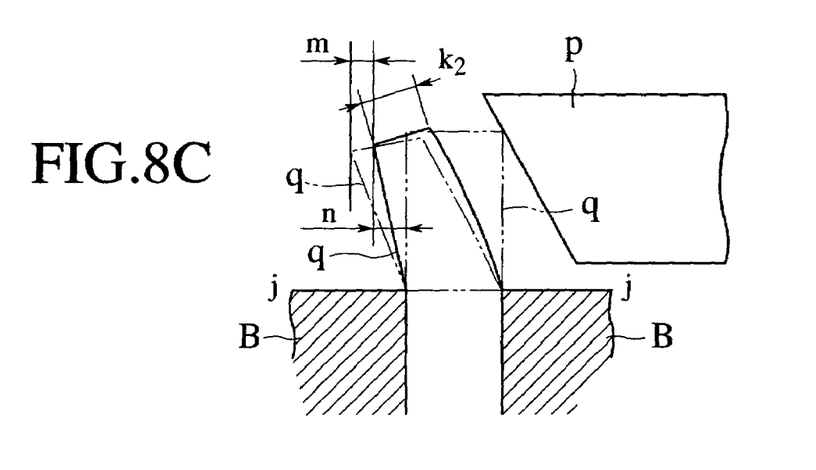

Next, a basic operation for performing a setting process will be described below with reference to FIGS. 8A, 8B and 8C. FIGS. 8A, 8B and 8C show a state of forming a saw tooth q to a setting amount n at a bending position j—j line by means of a pressing element P. The j—j line corresponds to a position on an upper surface of right and left clamp vices B. Accordingly, FIG. 8A shows a state in which the pressing element P is in contact with the saw tooth q, FIG. 8B shows a state in which the pressing element P reaches a stroke end, and FIG. 8C shows a state in which the pressing element P is apart from the saw tooth q and returns to the original position after the setting process is performed.

As is understood from FIGS. 8A, 8B and 8C, a relation $r > n$ is always generated between a pressing amount r by which the pressing element P presses the saw tooth q and a setting amount n. This phenomenon is caused by the following reasons:

(1) In comparison that the pressing element P is linearly moved, the saw tooth q is inclined in such a manner as to rotate.

(2) A spring back m is generated.

(3) A deformation ($k1-k2$) in a tip is generated.

Among them, with respect to the item (1), it is a constant amount even when the tip shape is different, however, with respect to the items (2) and (3), when the tip shape (particularly, the shape from the bending position j—j line of the set tooth to the tip) is different, there is generated a difference in the value of the spring back m and the deformation amount ($k1-k2$), and particularly the bending length on the bending position j—j line gives a great influence.

Accordingly, in the band saw blade BS having a variable pitch, since the tip shape of the set teeth b to e among the tooth type group is not constant and particularly the bending lengths L1 to L4 on the bending position j—j line are not constant, there is generated a difference in the value of the items (2) and (3) mentioned above, so that in order to make the setting amount n of each of the teeth b to e constant, it is necessary to adjust the projecting amount of the pressing element P independently in each of the teeth b to e.

Further, even in the case of adjusting such that each of the set teeth b to e becomes the same setting amount n, the deformation amount of the tip is different in each of the teeth due to the difference in the tooth shape. Accordingly, an amount of the unevenness in each of the tips is dispersed.

Therefore, it would be desirable to satisfy the user's need in the market and to provide a band saw blade that avoids the aforementioned disadvantages of the prior art devices, yet provides a band saw blade comprising a tip finished by grinding.

In order to produce a band saw blade having a further super accuracy for the future, it is indispensable to make a setting process highly accurate and stable, and it is an urgent necessity to establish a tooth design of a band saw blade and a method of producing the same with taking a plastic deformation at a time of performing a setting process into consideration.

Another embodiment of the present invention modified by taking the condition mentioned above into consideration will be described below in detail.

Figure 1A:
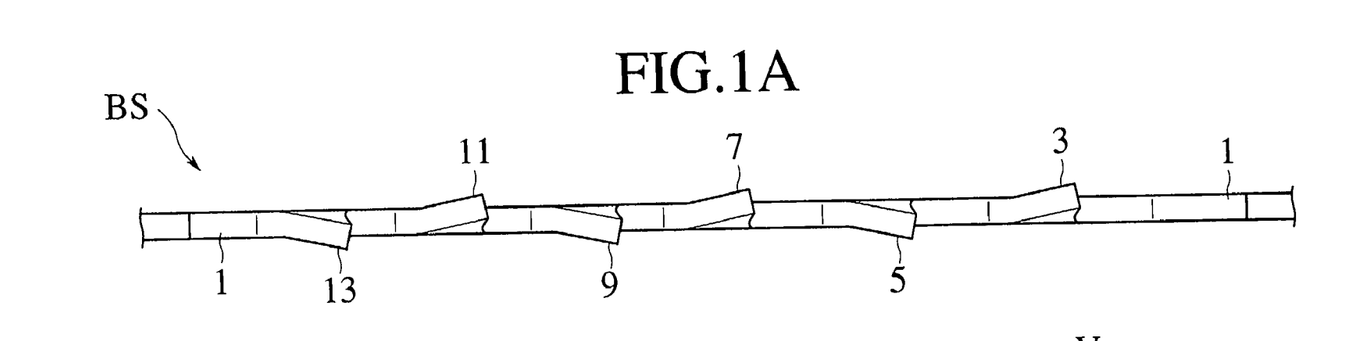
FIGS. 1A and 1B are schematic views which show a band saw blade in accordance with an embodiment of the present invention.
Figure 1B:
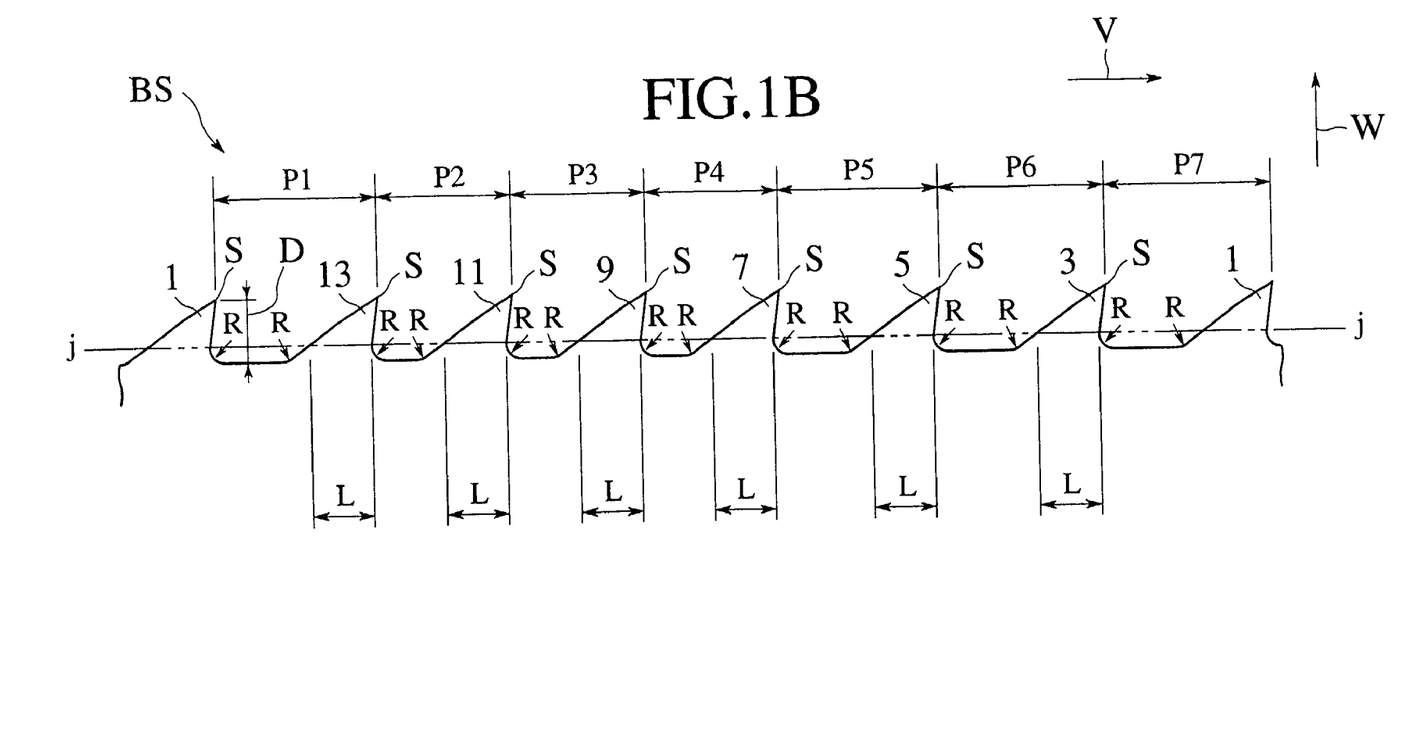

With reference to FIGS. 1A and 1B, a band saw blade BS with a variable pitch comprising seven teeth disposed at seven kinds of different pitches P1 to P7 as one group is shown. In this case, among the seven teeth 1, 3, 5, 7, 9, 11 and 13, the tooth 1 is an unset tooth, the teeth 3, 7 and 11 are left-set teeth and the teeth 5, 9 and 13 are right-set teeth. Further, all of positive rake angles and radial relief backs of the respective teeth 1 to 13 are constant, and further it is set that a tooth bottom R is constant in all the teeth and a gullet depth D is constant.

The band saw blade BS is produced in such a manner that a bending resistance at a time of performing a setting and bending in each of the set teeth becomes substantially equal to each other, the spring back amount of each of the set teeth after performing a setting and bending becomes substantially equal to each other, and the deformation amount of each of the set teeth after setting and bending becomes substantially equal to each other.

Accordingly, as shown in FIG. 1B, the j—j line shows the setting and bending position, and all of the bending length L of each of the set teeth 3 to 13 are constant. Further, the shape from the setting and bending position j—j line to the tip S of each of the set teeth 3 to 13 is constant in all the teeth. In this case, the setting and bending position may be closer to the tip S than the j—j line, and may be closer to the tooth bottom.

Accordingly, by making the bending length L of the setting and bending position j—j line in each of the set teeth 3 to 13 is substantially equal to each other, the bending resistance of each of the set teeth at a time of performing the setting process becomes substantially equal to each other and the spring back amount after setting and bending becomes substantially equal to each other. Further, a plurality of set teeth 3 to 13 can be pressed along the setting and bending position j—j line at the same time, and the setting amount can be simply adjusted.

In this case, when the bending length L within the one group of the teeth type is actually measured and the average value is set to be LA, it is desirable that the dispersion in each of the teeth is within ±10%.

Further, by making the shape from the setting and bending position j—j line to the tip S in each of the set teeth 3 to 13 substantially equal to each other, the deformation amount of the tip S after setting and bending becomes equal to each other in each of the set teeth 3 to 13, so that the unevenness in each of the set teeth 3 to 13 can be made even. Accordingly, the spring back amount and the deformation amount of each of the set teeth are substantially equal to each other, respectively, a setting process at a more even and accurate manner can be performed and the abrasion in each of the teeth in the band saw blade BS can be made even, so that the life can be increased and the roughness of the cutting surface can be improved.

Figure 2A:
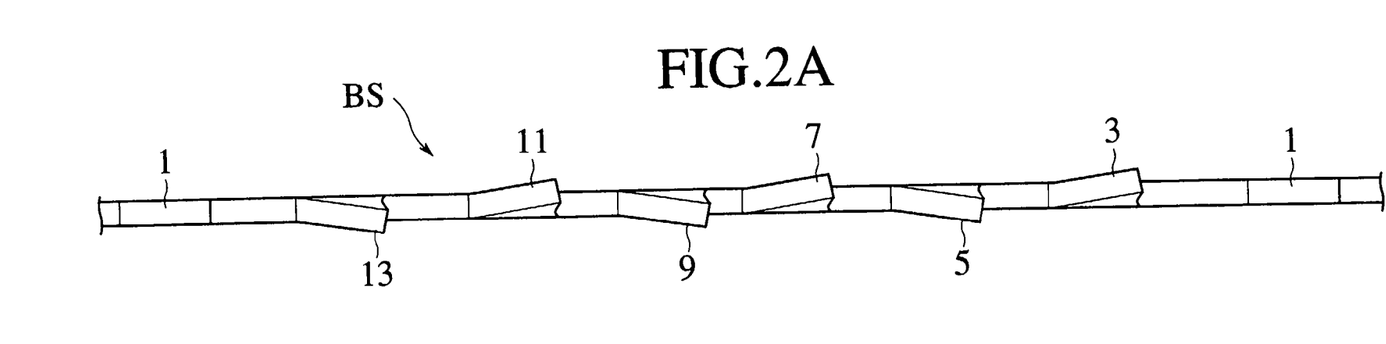
FIGS. 2A and 2B are schematic views which show a band saw blade in accordance with a second embodiment of the present invention.
Figure 2B:
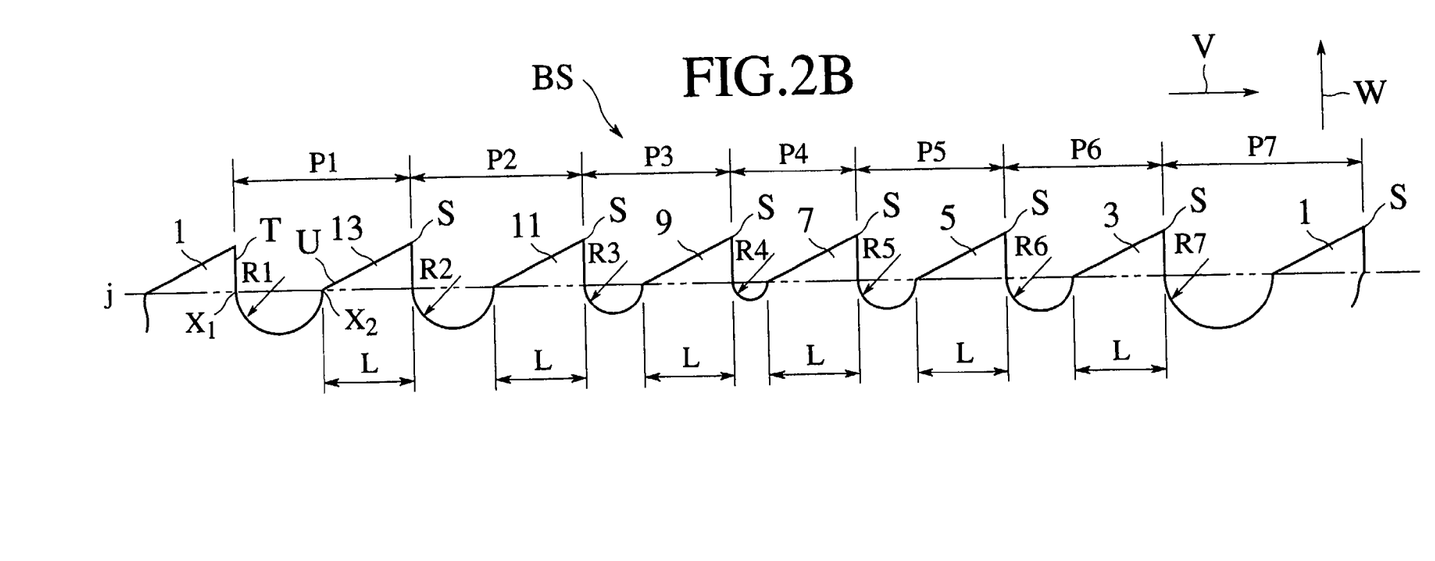

A second embodiment is shown in FIGS. 2A and 2B, and a band saw blade BS with a variable pitch comprising seven teeth disposed at seven kinds of different pitches P1 to P7 as one group is shown. Among the seven teeth 1, 3, 5, 7, 9, 11 and 13, the tooth 1 is an unset tooth, the teeth 3, 7 and 11 are left-set teeth and the teeth 5, 9 and 13 are right-set teeth.

Further, all of positive rake angles and radial relief backs of the respective teeth 1 to 13 are constant, and bending lengths L of each of the teeth 3 to 13 on the setting and bending position j—j line are all set to be constant. Further, the teeth bottoms R1 to R7 respectively have a different curvature, and it is set that a contact point of the tooth bottom R is not closer to the tip S than a crossing point X1 between the front surface T and the j—j line and a crossing point X2 between the surface of relief and the j—j line. Accordingly, all of the tip end shapes from the j—j line to the tip S are constant. In this case, the setting and bending position may be set to be closer to the tip S than the j—j line.

In this case, when the bending length L within the one group of the teeth type is actually measured and the average value is set to be LA, it is desirable that the dispersion in each of the teeth is within ±10%.

Accordingly, in the embodiment shown in FIGS. 2A and 2B, the same operation and effect as those of the saw blade embodied in FIGS. 1A and 1B mentioned above can be obtained.

Figure 3A:
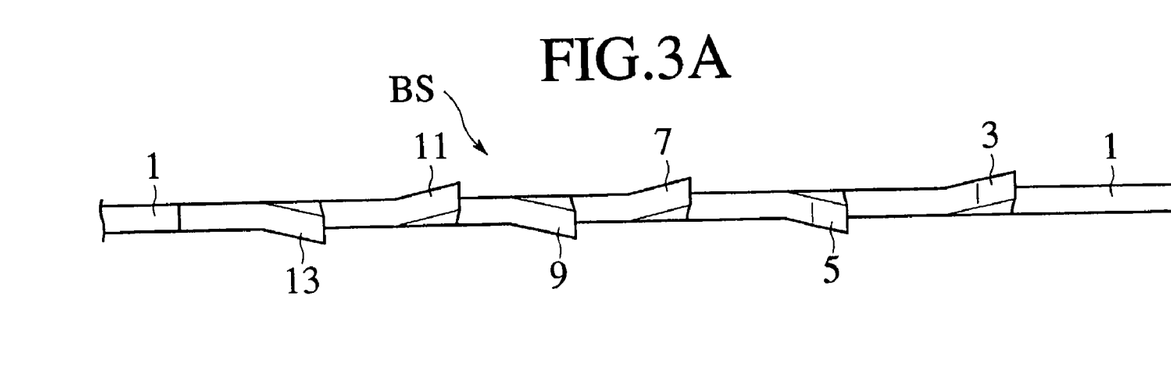
FIGS. 3A and 3B are schematic views which show a band saw blade in accordance with a third embodiment of the present invention.
Figure 3B:
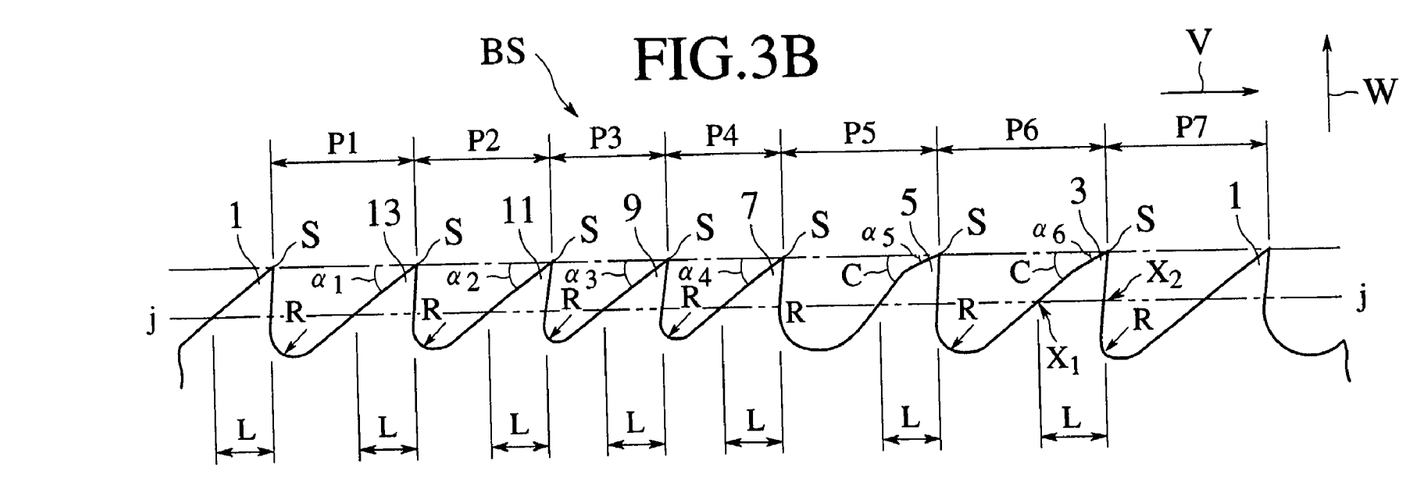

A third embodiment is shown in FIGS. 3A and 3B, and a band saw blade BS with a variable pitch comprising seven teeth disposed at seven kinds of different pitches P1 to P7 as one group is shown. Among the seven teeth 1, 3, 5, 7, 9, 11 and 13, the tooth 1 is an unset tooth, the teeth 3, 7 and 11 are left-set teeth and the teeth 5, 9 and 13 are right-set teeth. The tip end shapes of the set teeth 3 and 5 are formed to be equal to each other, and the tip end shapes of the set teeth 7, 9, 11 and 13 are formed to be equal to each other. Then, the radial relief backs α6 and α5 of the tip front end portion in the right and left set teeth 3 and 5 following to the unset tooth 1 are set to be smaller than the radial relief backs α4, α3, α2 and α1 of the other set teeth 7, 9, 11 and 13. Further, since the setting and bending position j—j line is not in contact with the tooth bottom R portion of any of the set teeth 3 to 13, the point X1 is disposed at a position of the line having the same bending length L as that of the set teeth 7, 9, 11 and 13 on the j—j line closer to the crossing point X2 between the front surface line and the j—j line in the tooth 3, the second radial relief back c is provided from the point X1 as shown in FIG. 3B and the tooth 5 is processed by the same method, thereby easily setting the setting and bending lengths L of all of the set teeth 3 to 13 substantially equal to each other.

In this case, when the bending length L within the one group of the teeth type is actually measured and the average value is set to be LA, it is desirable that the dispersion in each of the teeth is within ±10%.

Figure 4A:
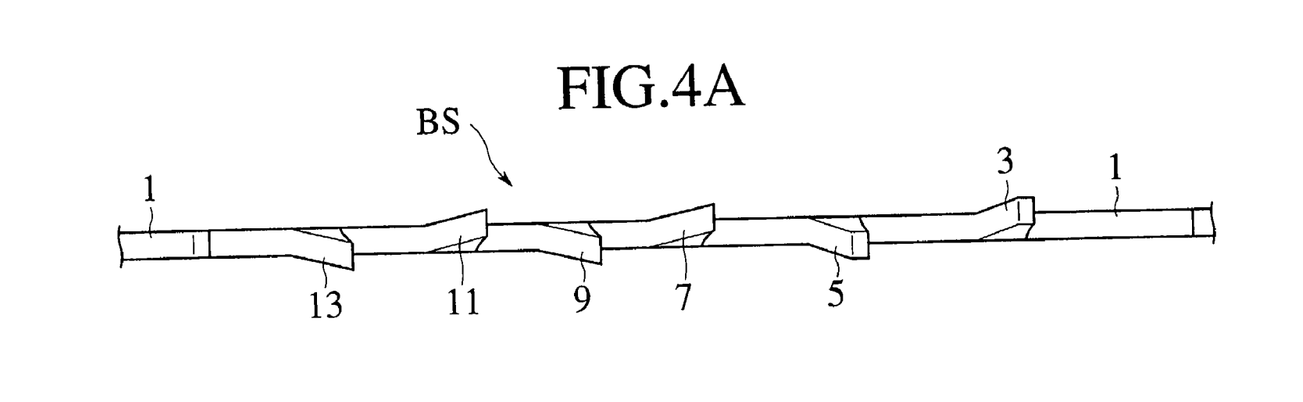
FIGS. 4A and 4B are schematic views which show a band saw blade in accordance with a fourth embodiment of the present invention.
Figure 4B:
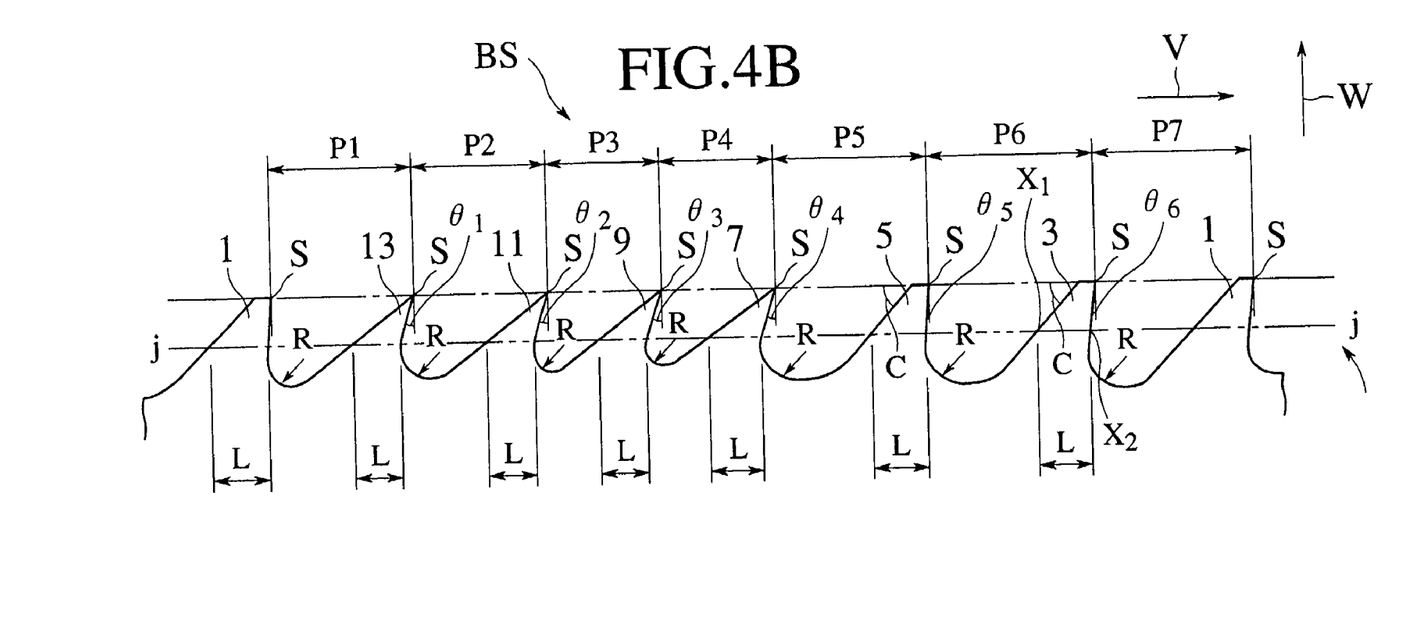

Accordingly, in the band saw blade BS shown in FIGS. 4A and 4B, even in the case that the shape from the setting and bending position j—j line to the tip of each of the teeth is different by providing the second radial relief back C in the teeth 3 and 5, the bending length L in each of the teeth is substantially equal to each other and the spring back amount after setting and bending becomes substantially equal to each other, so that the same operation and effect as those of the band saw blade BS shown in FIG. 1 can be obtained.

A fourth embodiment is shown in FIGS. 4A and 4B, and a band saw blade BS with a variable pitch comprising seven teeth disposed at seven kinds of different pitches P1 to P7 as one group is shown. Among the seven teeth 1, 3, 5, 7, 9, 11 and 13, the tooth 1 is an unset tooth, the teeth 3, 7 and 11 are left-set teeth and the teeth 5, 9 and 13 are right-set teeth. The tip end shapes of the set teeth 3 and 5 are formed to be equal to each other, and the tip end shapes of the set teeth 7, 9, 11 and 13 are formed to be equal to each other. The positive rake angles θ6 and θ5 of the right and left set teeth 3 and 5 following to the unset tooth 1 are set to be smaller than the positive rake angles θ4, θ3, θ2 and θ1 of the other set teeth 7, 9, 11 and 13.

Further, since the setting and bending position j—j line is not in contact with the tooth bottom R portion of any of the set teeth 3 to 13, the point X1 is disposed at a position of the line having the same bending length L as that of the set teeth 7, 9 and 11 on the j—j line closer to the crossing point X2 between the front surface line and the j—j line in the tooth 3, the second radial relief back c is provided from the point X1 as shown in FIG. 3B and the tooth 5 is processed by the same method, thereby easily setting the setting and bending lengths L of all of the set teeth 3 to 13 substantially equal to each other.

In this case, when the bending length L within the one group of the teeth type is actually measured and the average value is set to be LA, it is desirable that the dispersion in each of the teeth is within ±10%.

Accordingly, in the band saw blade BS shown in FIGS. 4A and 4B, even in the case that the shape from the setting and bending position j—j line to the tip of each of the teeth is different by providing the second radial relief back C in the teeth 3 and 5, the bending length L in each of the teeth is substantially equal to each other and the spring back amount after setting and bending becomes substantially equal to each other, so that the same operation and effect as those of the band saw blade BS shown in FIG. 1 can be obtained.

Figure 5A:
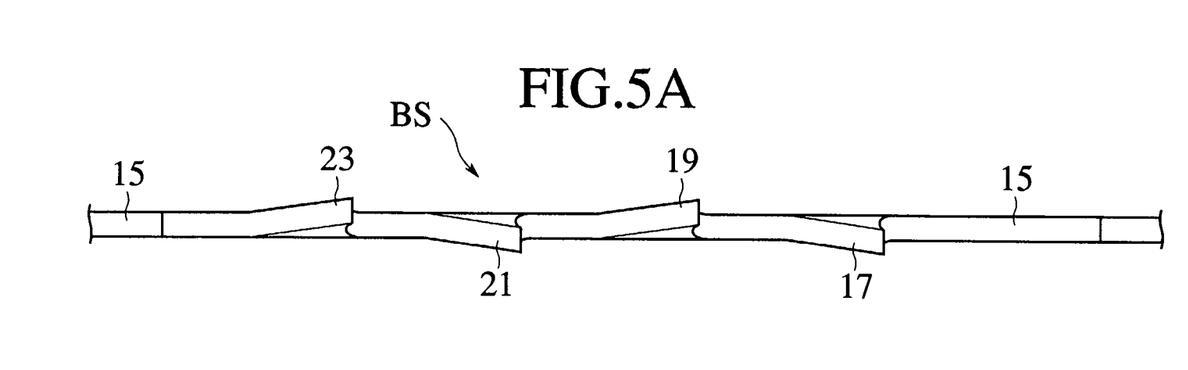
FIGS. 5A and 5B are schematic views which show a band saw blade in accordance with a fifth embodiment of the present invention.
Figure 5B:
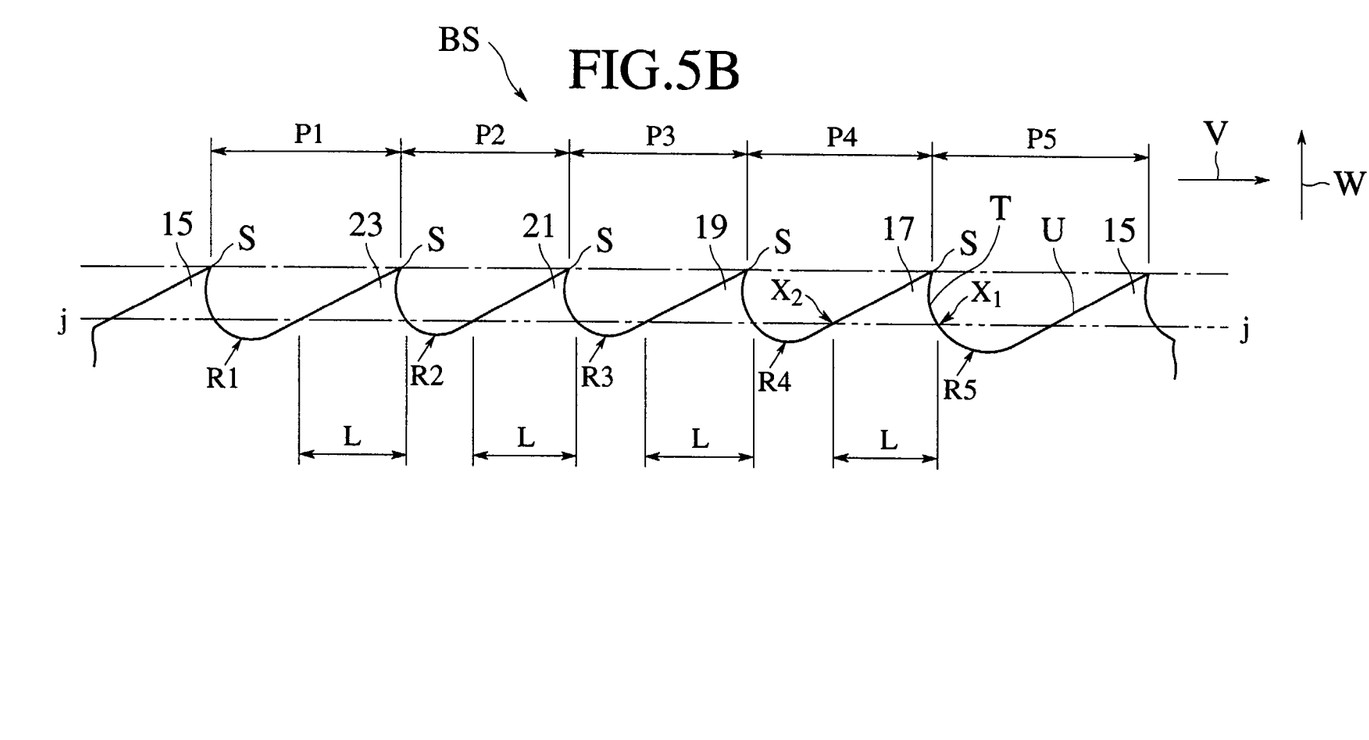

A fifth embodiment is shown in FIGS. 5A and 5B, and a band saw blade BS with a variable pitch comprising five teeth disposed at five kinds of different pitches P1 to P5 as one group is shown. Among the five teeth 15, 17, 19, 21 and 23, the tooth 15 is an unset tooth, the teeth 17 and 21 are right-set teeth and the teeth 19 and 23 are left-set teeth.

All of the unset tooth 15, the right-set teeth 17 and 21 and the left-set teeth 19 and 23 have the same radial relief back and the same positive rake angle, however, the curvature of the tooth bottoms R1 to R5 are different in all the teeth. Then, since the setting and bending position j—j line is in contact with the tooth bottom R close to the front surface T, the point X1 is disposed at a position of the line having the length L on the j—j line closer to the crossing point X2 between the surface of relief line and the j—j line so as to be in contact with the front surface T line and the surface of relief U line and the tooth bottom R is formed in such a manner as to pass through the point X1, thereby easily setting the setting and bending lengths L of all of the set teeth 17 to 23 substantially equal to each other.

In this case, when the bending length L within the one group of the teeth type is actually measured and the average value is set to be LA, it is desirable that the dispersion in each of the teeth is within ±10%.

Accordingly, in the band saw blade BS shown in FIGS. 5A and 5B, the same operation and effect as those of the band saw blade BS shown in FIG. 1 can be obtained.

Figure 6A:
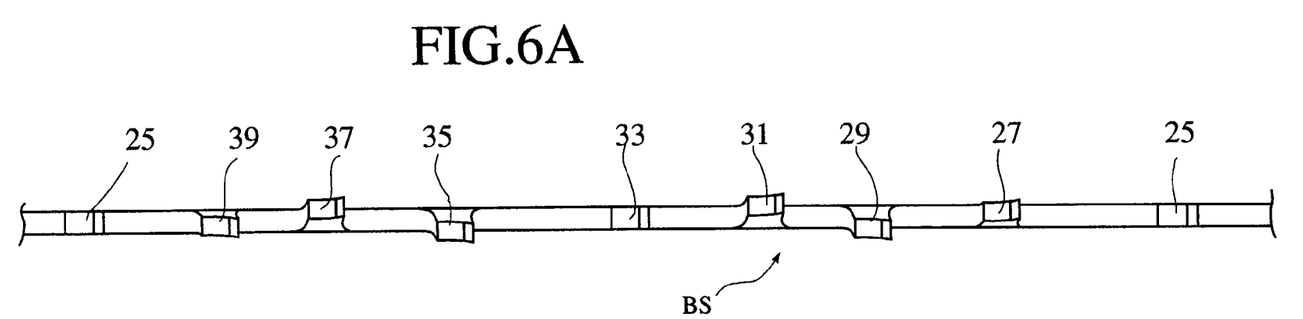
FIGS. 6A and 6B are schematic views which show a band saw blade in accordance with a sixth embodiment of the present invention.
Figure 6B:
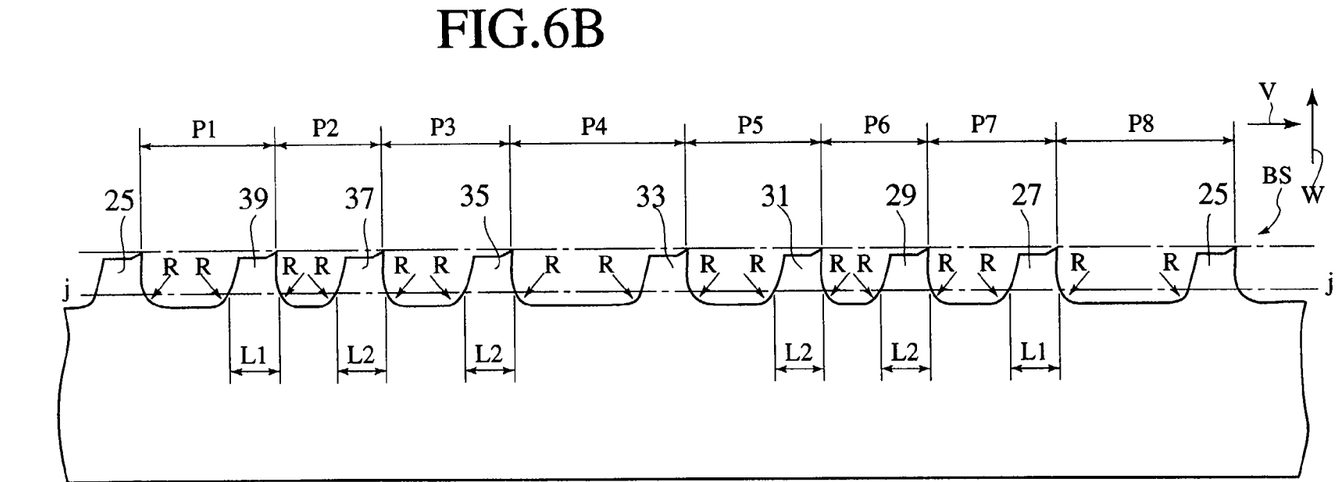

A sixth embodiment is shown in FIGS. 6A and 6B, and a band saw blade BS with a variable pitch comprising eight teeth disposed at eight kinds of different pitches P1 to P8 as one group is shown. In the band saw blade BS, the teeth 25 and 33 are unset teeth, the teeth 27, 31 and 37 are left-set teeth and the teeth 29, 35 and 39 are right-set teeth.

Then, the left-set tooth 27 and the right-set tooth 39 are formed in such a manner that the setting amount is small and the shape of the portion closer to the tip end than the setting and bending position j—j line is equal to each other, and the bending length L1 at the setting and bending position is set to be equal to each other. The setting amount of the right and left set teeth 29, 31, 35 and 37 is larger than the setting amount of the right and left teeth 27 and 39, the shape of the portion closer to the tip end than the setting and bending position j—j line in each of the set teeth 29, 31, 35 and 37 is set to be equal to each other and the bending length L2 at the setting and bending position is set to be equal to each other.

Accordingly, in the embodiment, the tip end shape and the setting and bending length in each of the set teeth having the equal setting amount in the right and left directions are set to be equal to each other. Accordingly, even in the case of the structure having a plurality of set teeth having the different right and left setting amounts, since the right and left set teeth having the equal setting amount in the right and left directions have the tip end shape and the setting and bending length equal to each other, they can be accurately set to the right and left directions in such a manner as to be equal to each other.

In this case, when the bending length L within the one group of the teeth type is actually measured and the average value is set to be LA, it is desirable that the dispersion in each of the teeth is within ±10%.

In this case, in the band saw blade BS shown in FIGS. 6A and 6B, the tip end shapes of all of the teeth may be equal to each other, the setting and bending length may be equal to each other, and the setting amount of all of the set teeth may be equal to each other.

In the embodiments shown in FIGS. 1 to 6 mentioned above, a direction indicated by an arrow v shows a moving direction of the band saw blade BS and a direction indicated by an arrow w shows a cutting direction against a work (not shown).

Further, in the embodiments shown in FIGS. 1 to 6, the embodiments are shown with respect to the band saw blade with the variable pitch comprising five teeth, seven teeth or eight teeth for constituting one group, however, the number of the teeth within the one group and the set pattern can be optionally set.

In this case, the present invention is not limited to the embodiments mentioned above, and can be realized by the other aspects by suitably modifying. For example, the setting and bending position in each of the set teeth may be disposed on different levels in place of being disposed on one straight line.

While preferred embodiments of the present invention have been described using specific terms, such description is for illustrative purposes, and it is to be understood that changes and variations may be made without departing from the spirit or scope of the following claims.

What is claimed is:

1. A band saw blade, comprising:
   at least a first left set tooth (27) which is bent along a first bending line extending in a moving direction (V) of the band saw blade to cut a workpiece;
   at least one unset tooth (25) which is located prior to the first left set tooth (27) so that the unset tooth (25) cuts the workpiece prior to that the first left set tooth (27) cuts the workpiece when the band saw blade is moved in the moving direction (V);
   at least a second right set tooth (29) which is bent along a second bending line extending in the moving direction;
   at least a third left set tooth (31) which is bent along a third bending line extending in the moving direction;
   at least a fourth right set tooth (35) which is bent along a fourth bending line extending in the moving direction;
   at least a fifth left set tooth (37) which is bent along a fifth bending line extending in the moving direction; and
   at least a sixth right set tooth (39) which is bent along a sixth bending line extending in the moving direction;
   wherein the band saw blade further comprises at least an additional unset tooth (33) which is located between the third left set tooth (31) and the fourth right set tooth (35);
   wherein the band saw blade is formed with a sequence of the unset tooth (25), the first left set tooth (27), the second right set tooth (29), the third left set tooth (31), the additional unset tooth (33), fourth right set tooth (35), the fifth left set tooth (37) and the sixth right set tooth (39);
   wherein the pitch (P8) in the moving direction (V) between the unset tooth (25) and the first left set tooth (27) is larger than the other pitch (P7) in the moving direction (V) between the first left set tooth (27) and the second right set tooth (29) and larger than the other pitch (P6) in the moving direction (V) between the second right set tooth (29) and the third left set tooth (31);
   wherein respective lengths of the first bending line, the second bending line, the third bending line and the fourth bending line are the same;
   wherein a straight imaginary line which is drawn by connecting tip ends of all the first to the sixth set teeth (25, 27, 29, 31, 33, 35, 37, 39) is parallel to the moving direction;
   wherein said first bending line, said second bending line, said third bending line and said fourth bending line are collinear with a single baseline(j—j), and wherein bottoms of gullets between the teeth are disposed below the single baseline (j).

2. The band saw blade according to claim 1, wherein each of the gullets between the teeth (25, 27, 29, 31, 33, 35, 37, 39) includes a straight portion and two round portions (R,R) of which radii are the same for each other.

3. The band saw blade according to claim 1, wherein the teeth have rake surfaces that are perpendicular to the moving direction.

* * * * *